(12) United States Patent
Abel et al.

(10) Patent No.: US 8,861,580 B2
(45) Date of Patent: Oct. 14, 2014

(54) METHOD AND APPARATUS FOR DETERMINING ONE OR MORE CHANNEL COMPENSATION PARAMETERS BASED ON DATA EYE MONITORING

(75) Inventors: Christopher J. Abel, Coplay, PA (US); Mohammad S. Mobin, Orefield, PA (US); Gregory W. Sheets, Bangor, PA (US); Lane A. Smith, Easton, PA (US)

(73) Assignee: Agere Systems LLC, Allentown, PA (US)

( * ) Notice: Subject to any disclaimer, the term of this patent is extended or adjusted under 35 U.S.C. 154(b) by 2139 days.

(21) Appl. No.: 11/434,687

(22) Filed: May 16, 2006

(65) Prior Publication Data
US 2007/0268984 A1    Nov. 22, 2007

(51) Int. Cl.
*H03H 7/30* (2006.01)
*H04L 25/03* (2006.01)
*H04L 1/20* (2006.01)

(52) U.S. Cl.
CPC . *H04L 25/03343* (2013.01); *H04L 2025/03681* (2013.01); *H04L 1/205* (2013.01); *H04L 2025/03802* (2013.01)
USPC ........... 375/232; 375/224; 375/226; 375/229; 375/230; 375/231; 375/348; 375/371; 375/372; 375/373; 375/374; 375/375; 375/376

(58) Field of Classification Search
USPC ......... 375/348, 355, 359, 229–233, 371–376; 370/503; 455/310
See application file for complete search history.

(56) References Cited

U.S. PATENT DOCUMENTS

| | | | | |
|---|---|---|---|---|
| 4,694,468 | A * | 9/1987 | Cullum | 375/224 |
| 5,991,346 | A * | 11/1999 | Lu | 375/355 |
| 7,068,726 | B1 * | 6/2006 | Zortea | 375/285 |
| 7,505,512 | B1 * | 3/2009 | Anderson et al. | 375/229 |
| 8,126,039 | B2 * | 2/2012 | Mobin et al. | 375/224 |
| 2002/0085656 | A1 * | 7/2002 | Lee et al. | 375/355 |
| 2003/0165208 | A1 * | 9/2003 | Carter et al. | 375/373 |
| 2005/0078188 | A1 * | 4/2005 | Cho et al. | 348/192 |
| 2005/0186933 | A1 * | 8/2005 | Trans | 455/296 |
| 2005/0238093 | A1 | 10/2005 | Payne et al. | |
| 2005/0259692 | A1 * | 11/2005 | Zerbe | 370/503 |
| 2005/0259726 | A1 * | 11/2005 | Farjad-rad | 375/232 |
| 2005/0281343 | A1 * | 12/2005 | Hsu et al. | 375/257 |
| 2006/0109896 | A1 * | 5/2006 | Steinbach et al. | 375/226 |
| 2006/0140323 | A1 * | 6/2006 | Eldredge | 375/376 |
| 2007/0237270 | A1 * | 10/2007 | Mezer et al. | 375/346 |
| 2007/0253475 | A1 * | 11/2007 | Palmer | 375/229 |
| 2008/0005629 | A1 | 1/2008 | Windler et al. | |
| 2008/0310495 | A1 | 12/2008 | Bulzacchelli et al. | |

* cited by examiner

*Primary Examiner* — Daniel Washburn
*Assistant Examiner* — Eboni Hughes
(74) *Attorney, Agent, or Firm* — Ryan, Mason & Lewis, LLP

(57) ABSTRACT

Methods and apparatus are provided for determining one or more channel compensation parameters based on data eye monitoring. According to one aspect of the invention, a method is provided for evaluating the quality of a data eye associated with a signal. The received signal is sampled for a plurality of different phases, for example, using at least two latches, and the samples are evaluated to identify when the signal crosses a predefined amplitude value, such as a zero crossing. It is determined whether the points of predefined amplitude crossing satisfy one or more predefined criteria. One or more parameters of one or more channel compensation techniques can optionally be adjusted based on a result of the determining step. One or more parameters of an adjacent transmitter can also be adjusted to reduce near end cross talk based on a result of the determining step.

24 Claims, 9 Drawing Sheets

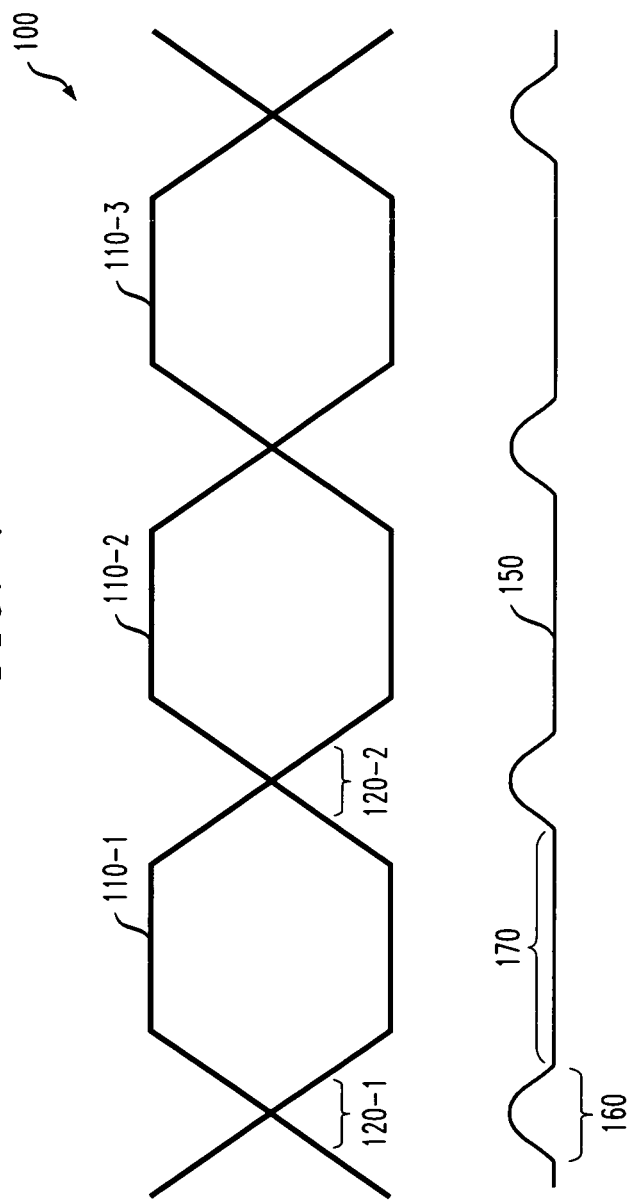

METHOD AND APPARATUS FOR DETERMINING ONE OR MORE CHANNEL COMPENSATION PARAMETERS BASED ON DATA EYE MONITORING

CROSS REFERENCE TO RELATED APPLICATIONS

The present application is related to U.S. patent application Ser. No. 11/434,686, entitled "Method and Apparatus for Measuring Duty Cycle Based on Data Eye Monitor," and U.S. patent application Ser. No. 11/434,688, entitled "Methods and Apparatus for Evaluating the Eye Margin of a Communications Device Using a Data Eye Monitor," each filed contemporaneously herewith and incorporated by reference herein.

FIELD OF THE INVENTION

The present invention is related to techniques for compensating for channel distortions and, more particularly, to techniques for determining when such channel compensation techniques have sufficiently compensated for the channel distortions.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. In order to compensate for such channel distortions, communication systems often employ well-known pre-emphasis techniques in the transmitter or equalization techniques in the receiver (or both). On the receiver side, well-known zero equalization or decision-feedback equalization (DFE) techniques (or both) are often employed. Such equalization techniques are widely-used for removing intersymbol interference and other noise. See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein. Generally, zero equalization techniques employ a high pass filter to compensate for the low pass effect asserted by the channel. The high pass filter can be a continuous or a discrete filter. Decision-feedback equalization utilizes a discrete-time feedback loop that adds a correction signal, which is a function of previously decoded symbol values, to the channel output.

While such pre-emphasis and equalization techniques can effectively compensate for channel distortions, over-compensation can also have a significant impact on performance. Thus, a number of techniques exist for determining when the equalization techniques have sufficiently compensated for the channel distortions. In the case of zero equalization, for example, an error term is typically fed back to adjust the filter coefficients using well-known techniques. In the case of DFE, a convergence criterion is applied that evaluates an error term. Such stopping criteria, however, have been found to require excessive time to converge and is expensive from an implementation perspective. A need therefore exists for improved techniques for determining when the channel compensation techniques have sufficiently compensated for the channel distortions. A further need exists for methods and apparatus for determining one or more parameters of the channel compensation techniques using data eye monitoring.

SUMMARY OF THE INVENTION

Generally, methods and apparatus are provided for determining one or more channel compensation parameters based on data eye monitoring. According to one aspect of the invention, a method is provided for evaluating the quality of a data eye associated with a signal. The received signal is sampled for a plurality of different phases, for example, using at least two latches, and the samples are evaluated to identify when the signal crosses a predefined amplitude value, such as a zero crossing. It is determined whether the points of predefined amplitude crossing satisfy one or more predefined criteria. One or more parameters of one or more channel compensation techniques can optionally be adjusted based on a result of the determining step. A current set of the one or more parameters can be maintained if the one or more predefined criteria are satisfied can be adjusted if the one or more predefined criteria are not satisfied. The predefined criteria can provide thresholds that specify a minimum degree of openness for the data eye.

In one exemplary implementation one latch is fixed approximately in a center of a data eye associated with the signal and at least a second latch can be repositioned based on the phase to sample the signal along a time axis. The signal crosses the predefined amplitude value when the two latches do not sample the same value of the signal.

According to another aspect of the invention, one or more parameters of an adjacent transmitter are adjusted to reduce near end cross talk based on a result of the determining step. For example, the one or more parameters of an adjacent transmitter can comprise one or more of amplitude, slew rate and pre-emphasis.

A more complete understanding of the present invention, as well as further features and advantages of the present invention, will be obtained by reference to the following detailed description and drawings.

BRIEF DESCRIPTION OF THE DRAWINGS

FIG. 1 graphically illustrates a number of ideal data eyes associated with a signal;

DETAILED DESCRIPTION

Figure 2A:
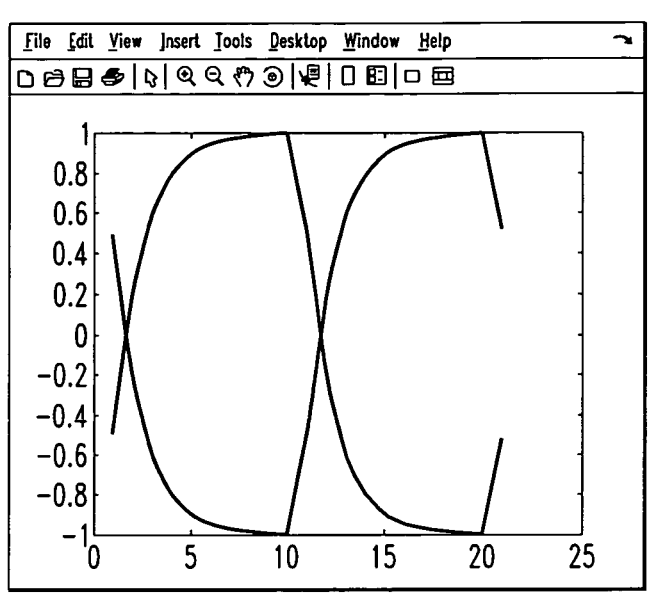
FIGS. 2A through 2C illustrate the distortion that can arise from a channel.

The present invention provides methods and apparatus for determining one or more parameters of the channel compensation techniques, based on an evaluation of the quality of the data eye. The disclosed techniques sample the data eye of a signal, for example, received over a communication channel, using a data eye monitor and evaluate one or more qualities of the data eye, such as a measure of how open the data eye is, to establish one or more channel compensation parameters. The exemplary data eye monitor may be implemented, for example, using the techniques described in U.S. patent application Ser. No. 11/095,178, filed Mar. 31, 2005, entitled "Method and Apparatus for Monitoring a Data Eye in a Clock and Data Recovery System," incorporated by reference herein. Generally, one or more latches associated with the exemplary data eye monitor are used to evaluate the openness of each eye in the signal, for example, along the horizontal (time) or vertical (amplitude) axis (or both). In one exemplary embodiment, a zero crossing optimization technique is employed that evaluates the openness of the data eyes along the time axis.

FIG. 1 graphically illustrates a number of ideal data eyes 110-1 through 110-3 associated with a signal 100. Although the ideal data eyes 110 shown in FIG. 1 do not exhibit any noise for ease of illustration, each data eye 110 is typically a superposition of a number of individual signals with varying frequency components, in a known manner. As discussed below in conjunction with FIGS. 5 and 6, two or more latches 520-fixed and 520-roam are used to evaluate the openness of each data eye 110 along the time axis. Generally, the two latches 520-fixed and 520-roam are used to measure the statistical variation for which the signal 100 is at a zero-crossing point (i.e., symbol-by-symbol variation in zero crossing times, as represented by the width of the zero crossing transitions), such as zero-crossing points 120-1, 120-2. It is noted that in the presence of a noisy signal, such as noise resulting from significant channel distortion, the data eyes 110 will exhibit a wider zero crossing point, as discussed further below. There is an inverse correlation between the statistical variation between the zero-crossing points 120-1, 120-2 and the degree of openness of each data eye 110. Thus, as the time duration between the zero-crossing points 120-1, 120-2 increases, the degree of openness of each data eye 110 decreases. The time between the approximate center of two zero-crossing points corresponds to the unit interval of the data eye.

FIG. 1 also includes a histogram 150 that is used to evaluate the statistical variation of the zero crossing points 120. Generally, an eye crossing histogram 160 will be evident in the histogram 150 that corresponds to the zero crossing points 120 and uniform portions 170 correspond to intervals when both latches 520-fixed and 520-roam are within the data eye 110 (i.e., in the eye opening). The histogram is obtained in a manner discussed further below in conjunction with FIG. 6.

According to one aspect of the present invention, the openness of each data eye of the signal 100 along the time axis can be evaluated based on the relative measurements of the two latches 520-fixed, 520-roam. As discussed further below, the parameters of one or more channel compensation techniques can be varied until one or more qualities of the data eye 110, such as a degree of openness, satisfy one or more predefined criteria.

As discussed further below in conjunction with FIG. 10, in one exemplary embodiment, the data eye monitor measures the signal 110 along the time axis to evaluate the statistical variation of the zero crossing points 120-1, 120-2. It is determined if the variation of the zero crossing points 120-1, 120-2 satisfy one or more predefined criteria. If the zero crossing optimization threshold is satisfied, the one or more channel compensation techniques have sufficiently compensated for channel distortions. If the zero crossing optimization threshold is not satisfied, however, one or more parameters of the channel compensation techniques are adjusted to alter the amount of compensation that is applied.

Figure 2B:
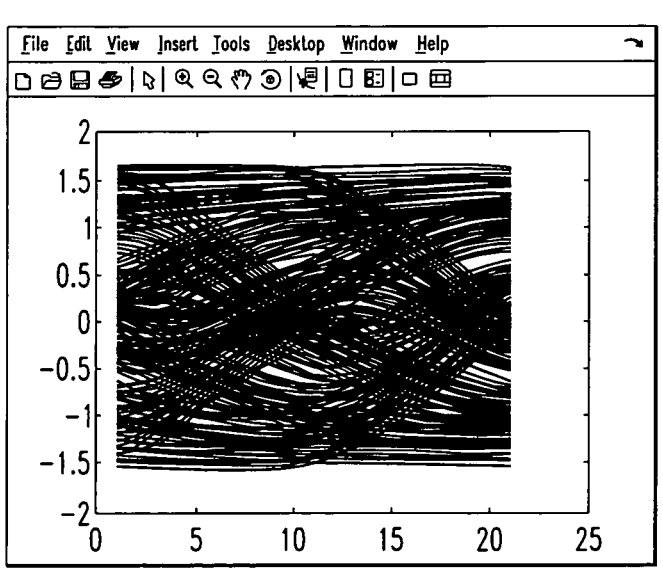
Figure 2C:

FIGS. 2A through 2C illustrate the distortion that can arise from a channel. FIG. 2A illustrates an ideal transmitter output 200. FIG. 2B illustrates the data eye 210 at the receiver that results from the channel distortion, when no channel compensation is applied. As evident in FIG. 2B, the data eye 210 is essentially closed due to the channel distortion. FIG. 2C illustrates the histogram 220 of the data eye, indicating that the statistical variation of the zero crossing point is essentially the entire unit interval (UI) associated with the data eye 210.

Figure 3A:
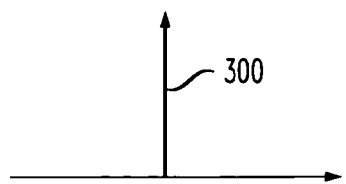
FIGS. 3A through 3D further illustrate the distortion that can arise from a channel.
Figure 3C:
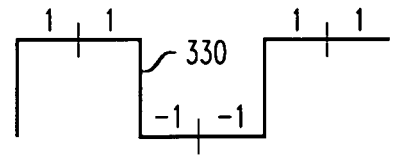
Figure 3B:
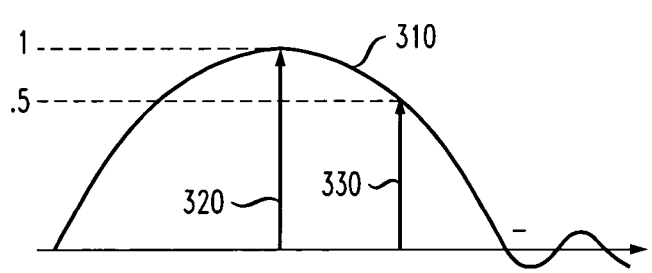

FIGS. 3A through 3D further illustrate the distortion that can arise from a channel. As shown in FIG. 3A, an ideal channel exhibits a delta function 300 as its impulse response. FIG. 3B illustrates an exemplary impulse response 310 for a hypothetical channel. As shown in FIG. 3B, in the time domain, the hypothetical channel may exhibit an impulse response having a magnitude of 1.0 at the main tap 320. In addition, at the first post-cursor 330, the hypothetical channel may exhibit an impulse response having a magnitude of 0.5. Thus, for this example, in the time domain, 50% of the signal will spillover and affect the next time interval.

Figure 3D:
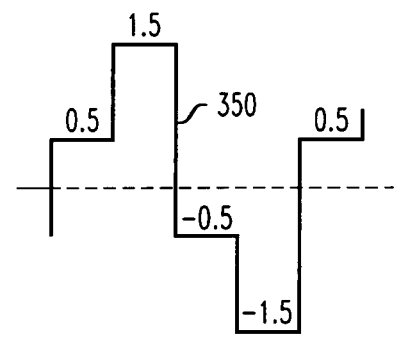

FIG. 3C illustrates an ideal clock signal 330 that may be transmitted across a channel. FIG. 3D illustrates the clock signal 350 that is received over the same channel as the result of channel distortion. As shown in FIG. 3C, in each subsequent time slot, values of +1, +1, −1, −1, +1, +1, −1, −1, are transmitted to generate the clock signal 330. Assuming a channel having the exemplary impulse response 310 of FIG. 3B, and no channel compensation, the receiver will receive the signal 350 shown in FIG. 3D. For example, the +1 that is transmitted in the first time slot will appear as a +1 at the receiver. The +1 that is transmitted in the second time slot will be superimposed with 50% of the +1 that was transmitted in the first time slot. Thus, a value of +1.5 will be measured at the receiver in the second time slot. Generally, one or more of pre-emphasis techniques in the transmitter or equalization techniques in the receiver (or both) are employed in a well-known manner so that the signal processed by the receiver looks like the clock signal 330 that was transmitted.

Figure 4:
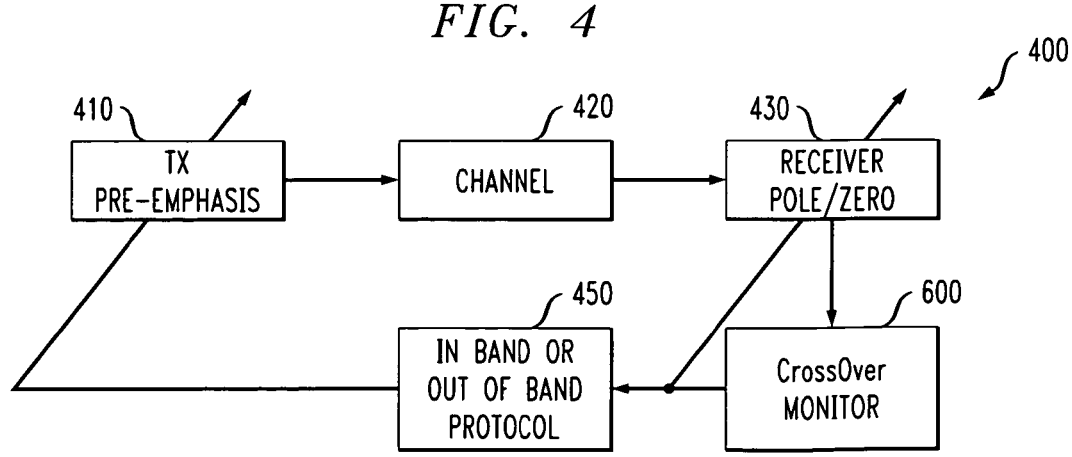
FIG. 4 illustrates an exemplary signal flow for a channel compensation parameter optimization in accordance with the present invention.

FIG. 4 illustrates an exemplary signal flow 400 for a channel compensation parameter optimization in accordance with the present invention. As shown in FIG. 4, pre-emphasis techniques 410 are applied in the transmitter before the signal is transmitted over a channel 420. In addition, equalization techniques 430, such as zero equalization, are applied in the receiver. According to one aspect of the invention, a cross over monitor 600, discussed below in conjunction with FIG. 6, implements a channel compensation parameter optimization process 1000, discussed below in conjunction with FIG. 10, to determine when one or more of the pre-emphasis 410 and equalization 430 have sufficiently compensated for the channel distortion. When pre-emphasis techniques 410 are applied in the transmitter, the output of the cross over monitor 600 is fed back to the transmitter using an in-band or out of band protocol 450.

Figure 5:
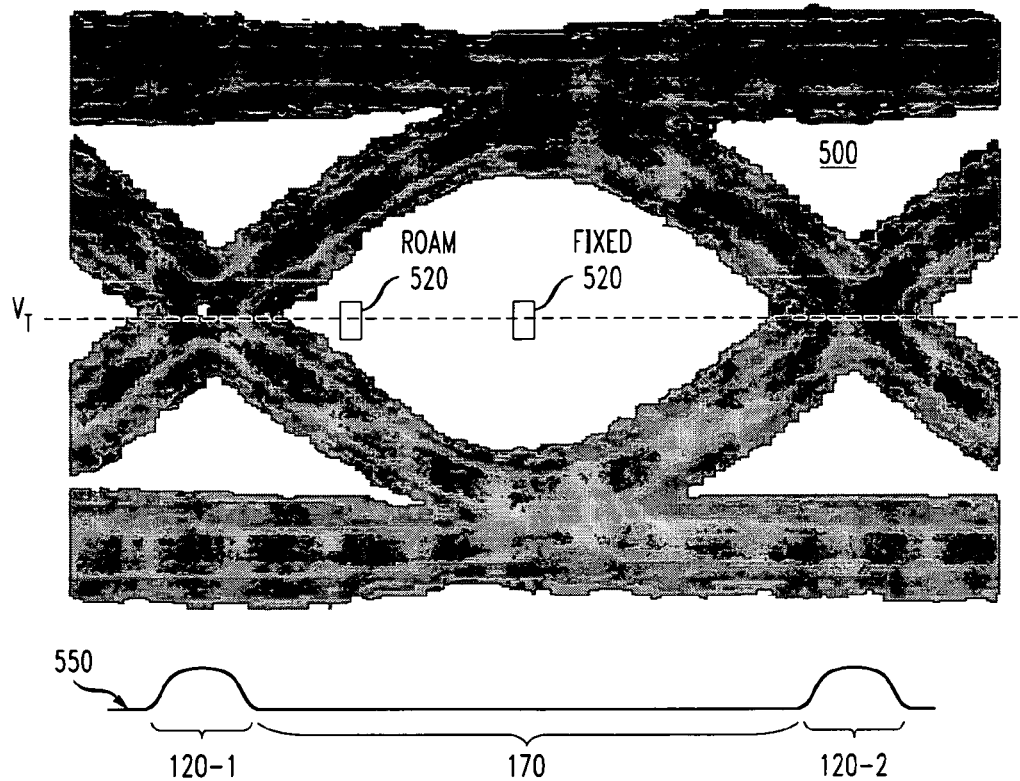
FIG. 5 illustrates the measurement of the unit interval of a data eye in accordance with one embodiment of the present invention.

FIG. 5 illustrates the measurement of the unit interval of a data eye 500 in accordance with one embodiment of the present invention. As shown in FIG. 5, and discussed further below in conjunction with FIG. 6, two latches 520-fixed and 520-roam are used to measure the unit interval 150 of each data eye 110. Generally, the two latches 520-fixed and 520-roam are used to determine the statistical variation of the zero-crossing points, such as zero-crossing points 120-1, 120-2, using the histogram information 550. Generally, noisy portions will be evident in the histogram 550 that corresponds to the zero crossing points 120.

The fixed latch 520-fixed is fixed at approximately the center of each unit interval. The roaming latch 520-roam samples the signal along the time domain based on the roaming clock. In addition, the number of "hits" (e.g., the number of times the samples obtained by the two latches 520-fixed and 520-roam do not match) can be counted and used as a measure of the statistical variation of each zero-crossing point 120-1, 120-2. Generally, in one exemplary embodiment, a "hit" occurs whenever the two latches 520-fixed and 520-roam do not measure the same value. In this manner, a hit occurs when the roaming latch 520-roam is in a zero crossing point.

Figure 6:
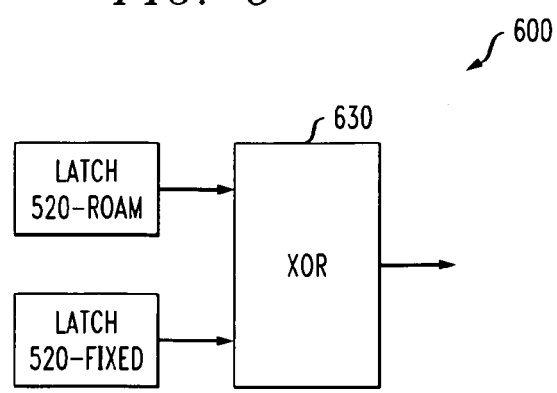
FIG. 6 illustrates one embodiment of the roaming latches of FIG. 5.

FIG. 6 illustrates one embodiment of the roaming latches 600 of FIG. 5. As shown in FIG. 6, the outputs of the two latches 520-fixed and 520-roam of FIG. 5 are applied to an exclusive OR (XOR) gate 630. The XOR gate 630 compares the value of the two latches 520-fixed and 520-roam. If the values of the two latches 520-fixed and 520-roam match, the XOR gate 630 will generate a binary value of 0 and if the values of the two latches 520-fixed and 520-roam do not match, the XOR gate 630 will generate a binary value of 1. Thus, a "hit" occurs in the exemplary embodiment when the values of the two latches 520-fixed and 520-roam do not match.

The relative values of the two latches 520-fixed and 520-roam provide an indication of location of the data transitions (i.e., zero crossings). If the two latches 520-fixed and 520-roam have the same value, they are said to match. Thus, for samples taken inside a data eye, it would be expected that the value of the two latches 520-fixed and 520-roam match one another. For samples taken along the boundary of the data eye (i.e., in the zero crossing), it would be expected that some of the values of the two latches 520-fixed and 520-roam will match one another. For samples taken outside a data eye, it would be expected that the values of the two latches 520-fixed and 520-roam will not match. Thus, the number of samples taken outside the eye provides an indication of the statistical variation of the zero crossing points.

The output of the XOR 630 can be used to generate the eye trace 150 shown in FIG. 1. As previously indicated, the XOR 630 will generate a binary value of 0 when the outputs of the two latches 520-fixed and 520-roam match, and will generate a binary value of 1 when the outputs of the two latches 520-fixed and 520-roam do not match. Thus, binary values of 1 will be expected when the roaming latch 520-roam is sampling in the locations of zero-crossing points 120-1, 120-2. Similarly, binary values of 0 will be expected when the latch 520-roam is sampling in a location 170 that is inside the data eye 500.

Figure 7A:
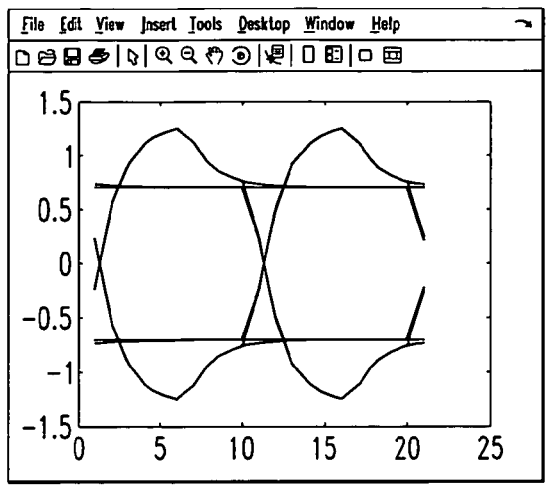
FIGS. 7 through 9 illustrate the resulting channel distortion for different channel distortion parameter settings.
Figure 7B:
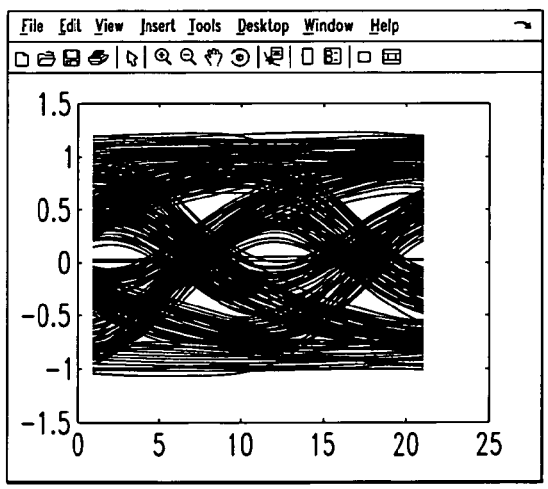
Figure 7C:
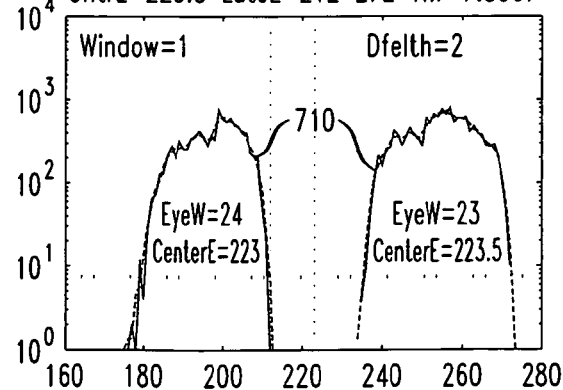
Figure 8A:
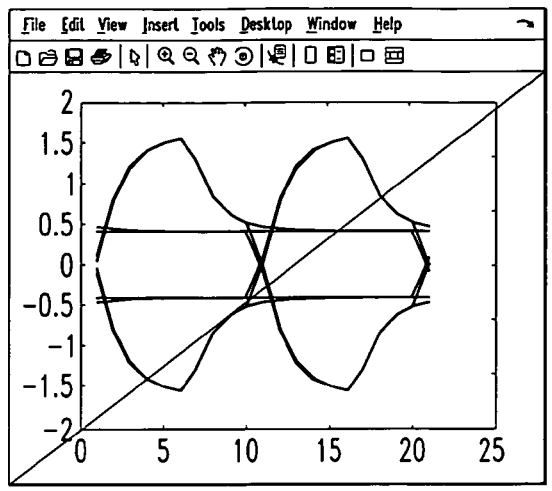
Figure 8B:
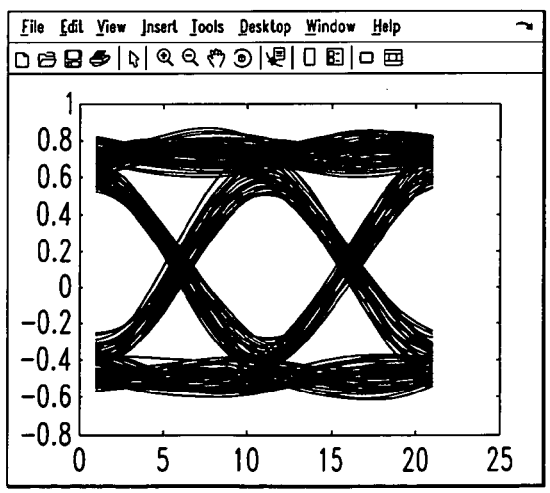
Figure 8C:
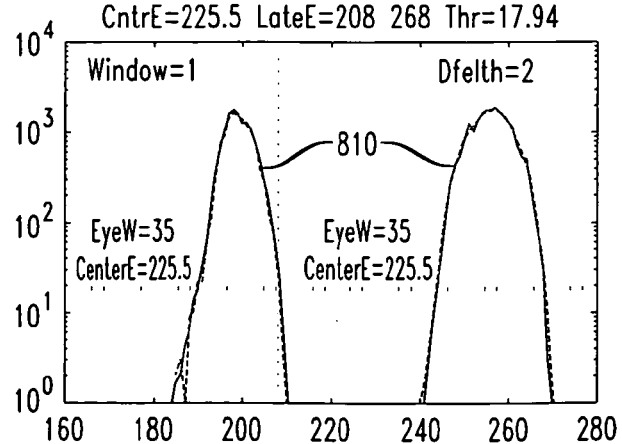
Figure 9A:
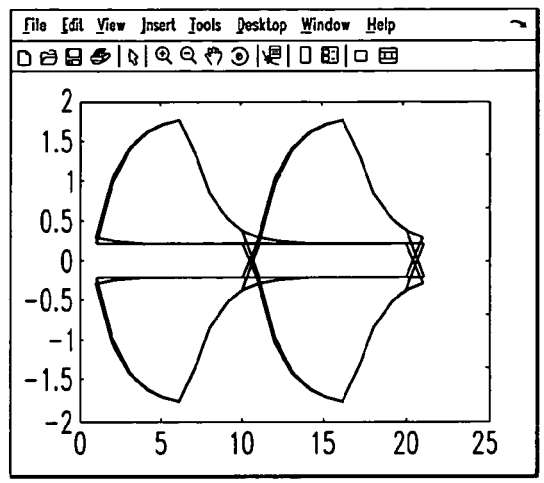
Figure 9B:
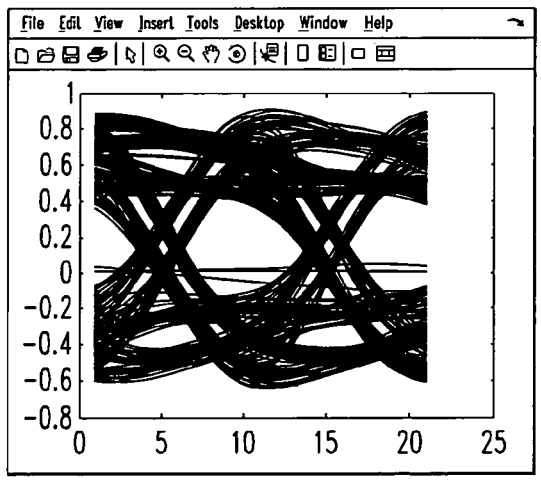
Figure 9C:
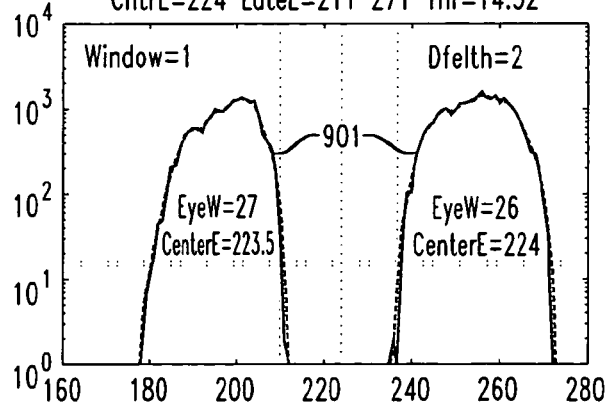

FIGS. 7 through 9 illustrate the resulting channel distortion for different channel distortion parameter settings. In the exemplary embodiment, the only applied compensation is pre-emphasis in the transmitter. FIGS. 7A through 7C are associated with an applied pre-emphasis of 0.2. FIGS. 8A through 8C are associated with an applied pre-emphasis of 0.5. FIGS. 9A through 9C are associated with an applied pre-emphasis of 0.8. FIGS. 7A, 8A and 9A illustrate the transmitter output. FIGS. 7B, 8B and 9B illustrate the data eye at the receiver that results from the channel distortion, when the indicated amount of channel compensation (pre-emphasis) is applied. As discussed further below, the openness of the data eyes are evaluated in accordance with the present invention to select the compensation parameters. FIGS. 7C, 8C and 9C illustrate the histogram of the data eye, which is processed to obtain the statistical variation of the zero crossing point associated with the corresponding data eye. As shown in FIGS. 7C, 8C and 9C, the histogram of the data eye exhibits peaks 710, 810, 910, respectively, during zero crossing intervals. Thus, the statistical variation of the peak can be measured to determine the statistical variation of the zero crossings. Alternatively, the statistical variation of the interval between two peaks 710, 810, 910 can be used as an estimate of the duration when the data eye is open.

Visually, the data eye shown in FIG. 8B appears to be the most open. As discussed below in conjunction with FIG. 10, the channel compensation parameter optimization process 1000 processes the histogram associated with each data eye, to obtain the statistical variation of the zero crossing point. In the exemplary embodiment, the channel distortion parameters associated with the data eye having the shortest duration of the zero crossing point are selected. In one implementation, the applied channel compensation can be increased until the histogram exhibits bi-modality (i.e., two peaks on each "peak"). Bi-modality occurs when the received signal is over-equalized (e.g., a gap is present among the "noise" 160 in the histogram 550). Generally, it is desired to select the parameters associated with the histogram having the narrowest pulse (associated with hits occurring during points of zero crossing) and the widest eye opening (associated with samples occurring inside the data eye).

Figure 10:
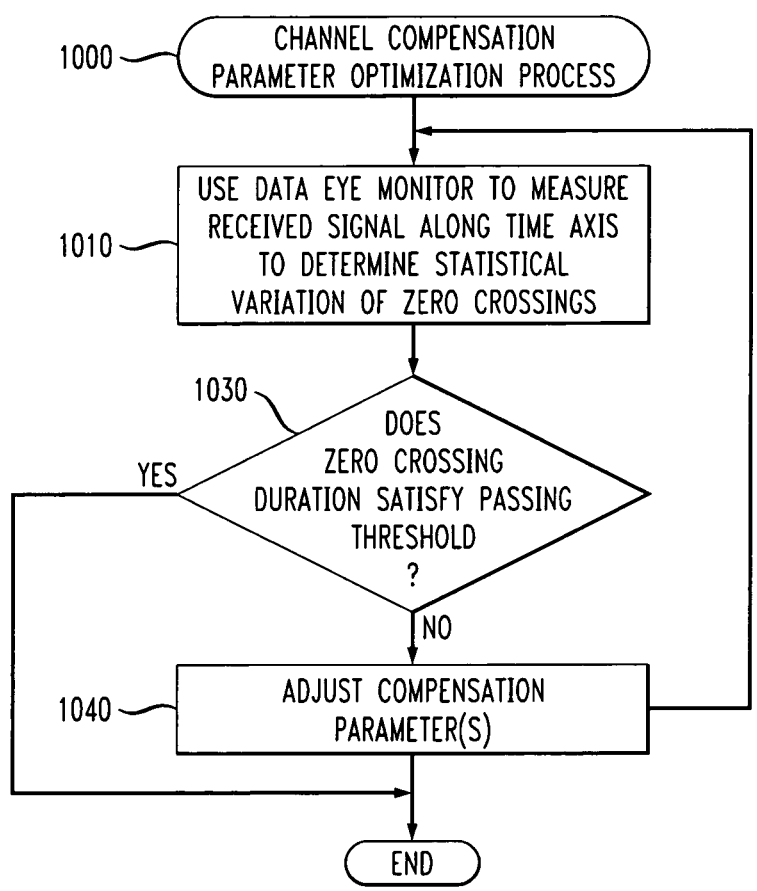
FIG. 10 is a flow chart describing an exemplary channel compensation parameter optimization process incorporating features of the present invention.

FIG. 10 is a flow chart describing an exemplary channel compensation parameter optimization process 1000 incorporating features of the present invention. As shown in FIG. 10, the exemplary channel compensation parameter optimization process 1000 initially measures the signal 110 along the time axis during step 1010 to determine the statistical variation of the zero crossing points 150-1, 150-2. During step 1030, it is determined if the zero crossing statistical variation satisfies a predefined maximum zero crossing threshold. It is noted that an alternate implementation can evaluate the duration of the samples within the data eye (i.e., the duration of the uniform portion 170 of FIG. 1, corresponding to intervals when both latches 520-fixed and 520-roam are within the data eye 110). If the zero crossing statistical variation threshold is satisfied, the current channel distortion parameters are maintained and the evaluation process is repeated. If, however, the zero crossing statistical variation threshold is not satisfied, one or more channel distortion parameters are adjusted during step 1040 and the evaluation process is repeated.

It is noted that by employing additional latches, additional information can be obtained about the quality of the data eye. For example, if a roaming latch is also used in the vertical (amplitude) direction, the present invention can also assess how open the eye is in the vertical direction. In one embodiment, such vertical optimization can provide a secondary consideration that can be used, for example, in the event that different channel distortion parameters provide the same degree of openness in the horizontal (time) direction.

Figure 11:
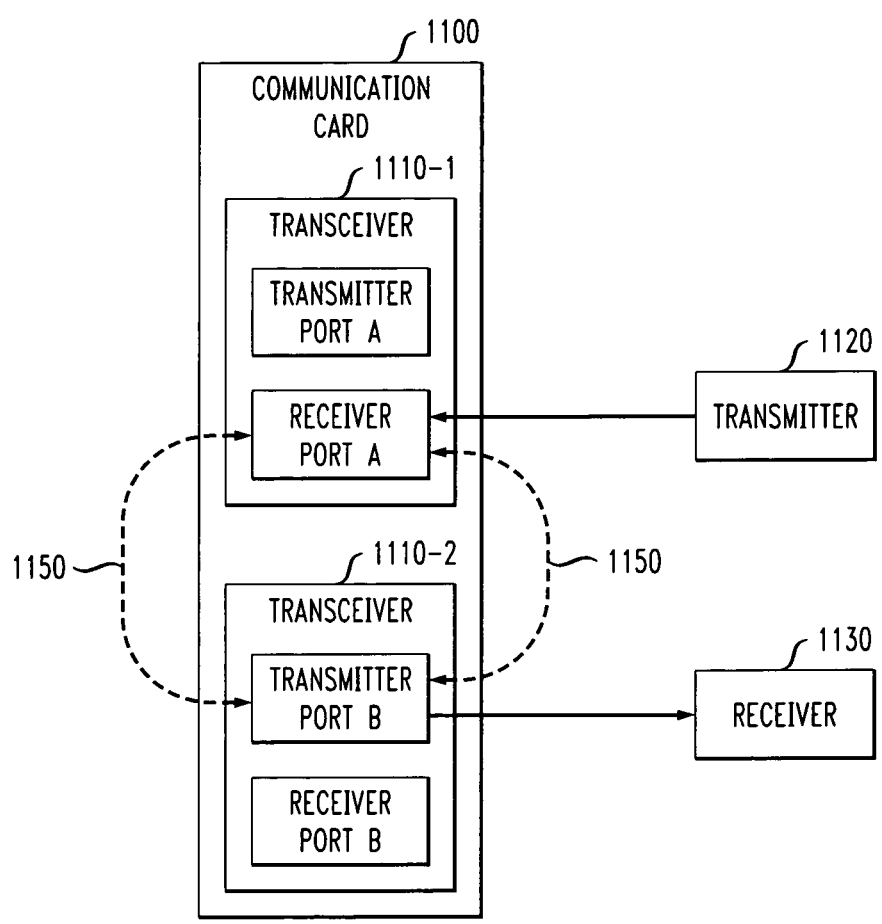
FIG. 11 is a block diagram of a communication system incorporating features of the present invention.

In addition, the present invention can be employed to reduce near-end cross-talk (NEXT). FIG. 11 is a block diagram of a communication system incorporating features of the present invention. As shown in FIG. 11, communication ship or circuit card 1100 may contain a plurality of transceivers, such as transceivers 1110-1 and 1110-2. Each transceiver 1110 comprises a transmitter and receiver portion. Each transceiver 1110 is typically considered a port on the communication system. The signal transmitted by the transmitter of transceiver 1110-2 causes NEXT 1150 on the receiver of transceiver 1110-1, in a known manner.

In one exemplary implementation, the NEXT 1150 can be evaluated by using the disclosed roaming eye monitor techniques to compare the horizontal (jitter) or vertical eye opening (or both) with adjacent transmitters turned off, and with adjacent transmitters turned on. In a further variation, the disclosed roaming eye monitor techniques can be employed to evaluate various settings of one or more of amplitude, slew rate and pre-emphasis for an adjacent transmitter.

If an "acceptable" level of degradation is defined, the present invention can constrain the "acceptable" ranges of one or more of amplitude, slew rate and pre-emphasis for an adjacent transmitter. For example, for the two transceiver ports A and B shown in FIG. 11, receiver A and transmitter B are adjacent on a chip 1100. Assume that transmitter B starts with a large output amplitude and a high level of pre-emphasis, which together result in significant NEXT 1150 at receiver A. It may be possible for transmitter B to reduce its amplitude and pre-emphasis to reduce the NEXT 1150 at receiver A, while receiver 1130 can increase its own channel compensation to account for reduced compensation from transmitter B.

It is noted that the accuracy of the present invention can be improved if one or more techniques are employed for duty cycle correction. For a discussion of suitable techniques for duty cycle correction, see, U.S. patent application Ser. No. 11/434,686, filed May 16, 2006, entitled "Method and Apparatus for Measuring Duty Cycle Based on Data Eye Monitor," incorporated by reference herein.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for evaluating the quality of a data eye associated with a signal, comprising:
    sampling said received signal for a plurality of different phases, wherein a first phase samples said received signal substantially in a middle of said data eye;
    creating a data crossing histogram at a data transition phase based on said samples and said plurality of different phases;
    determining a duration of said data crossing histogram; and
    adjusting one or more equalization parameters using one or more channel compensation techniques to reduce said duration of said data crossing histogram if said data crossing histogram duration does not satisfy a predefined threshold indicating a maximum allowable data crossing histogram duration.

2. The method of claim 1, wherein a current set of said one or more parameters are maintained if said one or more predefined criteria are satisfied.

3. The method of claim 1, wherein a current set of said one or more parameters are adjusted if said one or more predefined criteria are satisfied.

4. The method of claim 1, wherein said one or more predefined criteria provide thresholds that specify a minimum degree of openness for said data eye.

5. The method of claim 1, wherein said determining step is based on a crossing of a predefined amplitude value.

6. A method for evaluating the quality of a data eye associated with a received signal, comprising:
    sampling said received signal for a plurality of different phases, wherein a first phase sample said received signal substantially in a middle of said data eye;
    creating a histogram based on said samples and said plurality of different phase;
    determining a size of an opening of said data eye using said histogram; and
    adjusting one or more parameters of one or more channel compensation techniques for equalization based on a result of said determining step, wherein said sampling step further comprises the step of sampling said received signal using at least two latches.

7. The method of claim 6, wherein one of said latches is fixed approximately in a center of said data eye associated with said received signal, and a second one of said latches can be repositioned based on said phase to sample said signal along a time axis.

8. The method of claim 7, wherein said signal crosses a predefined amplitude value when said two latches do not sample the same value of said received signal.

9. The method of claim 1, wherein said determining step is based on points of predefined amplitude crossing that are processed by evaluating a statistical variation of samples taken within said data eye.

10. The method of claim 1, further comprising the step of adjusting one or more parameters of an adjacent transmitter to reduce near end cross talk based on a result of said determining step.

11. The method of claim 10, wherein said one or more parameters of an adjacent transmitter comprise one or more of amplitude, slew rate and pre-emphasis.

12. A circuit for evaluating the quality of a data eye associated with a received signal, comprising:
    one or more latches configured to sample said received signal for a plurality of different phases, wherein a first phase samples said received signal substantially in a middle of said data eye;
    a cross over monitoring circuit configured to:
    create a data crossing histogram at a data transition phase based on said samples and said plurality of different phases;
    determine a duration of said data crossing histogram; and
    adjust one or more equalization parameters using one or more channel compensation techniques to reduce said duration of said data crossing histogram if said data crossing histogram duration does not satisfy a predefined threshold indicating a maximum allowable data crossing histogram duration.

13. The circuit of claim 12, wherein a current set of said one or more parameters are maintained if one or more predefined criteria are satisfied.

14. The circuit of claim 12, wherein a current set of said one or more parameters are adjusted if one or more predefined criteria are satisfied.

15. The circuit of claim 12, wherein one or more predefined criteria provide thresholds that specify a minimum degree of openness for said data eye.

16. The circuit of claim 12, wherein said determining step is based on a crossing of a predefined amplitude value.

17. A circuit for evaluating the quality of a data eye associated with a received signal, comprising:
    one or more latches configured to sample said received signal for a plurality of different phases, wherein a first phase samples said received signal substantially in a middle of said data eye;
    a cross over monitoring circuit configured to:
    create a histogram based on said samples and said plurality of different phases;
    determine a size of an opening of said data eye using said histogram; and
    adjust one or more parameters of one or more channel compensation techniques for equalization based on a result of said determining step, wherein one of said latches is fixed approximately in a center of said data eye associated with said received signal and a second one of said latches can be repositioned based on said phase to sample said received signal along a time axis.

18. The circuit of claim 17, wherein said received signal crosses a predefined amplitude value when said two latches do not sample the same value of said received signal.

19. The circuit of claim 12, wherein said determining step is based on points of a predefined amplitude crossing that are processed by evaluating a statistical variation of samples taken within said data eye.

20. The circuit of claim 12, further comprising the step of adjusting one or more parameters of an adjacent transmitter to reduce near end cross talk based on a result of said determining step.

21. The circuit of claim 20, wherein said one or more parameters of an adjacent transmitter comprise one or more of amplitude, slew rate and pre-emphasis.

22. The circuit of claim 12, wherein said circuit is an integrated circuit.

23. A method for reducing near end cross talk from an adjacent transmitter, comprising:
   sampling a received signal for a plurality of different phases with said adjacent transmitter turned on and said adjacent transmitter turned off, wherein a first phase samples said received signal substantially in a middle of said data eye;
   creating a data crossing histogram at a data transition phase based on said samples and said plurality of different phases;
   determining a duration of said data crossing histogram; and
   adjusting one or more equalization parameters using one or more channel compensation techniques to reduce said duration of said data crossing histogram if said data crossing histogram duration does not satisfy a predefined threshold indicating a maximum allowable data crossing histogram duration.

24. The method of claim 23, wherein said one or more parameters of an adjacent transmitter comprise one or more of amplitude, slew rate and pre-emphasis.

* * * * *